United States Patent [19]

Rees

[11] Patent Number: 4,982,222
[45] Date of Patent: Jan. 1, 1991

[54] IMAGING SYSTEM UTILIZING AN OSCILLATING GRADIENT INDEX LENS ARRAY

[75] Inventor: James D. Rees, Pittsford, N.Y.
[73] Assignee: Xerox Corporation, Stamford, Conn.
[21] Appl. No.: 890,204
[22] Filed: Jul. 28, 1986
[51] Int. Cl.⁵ .............................................. G03B 27/00
[52] U.S. Cl. ........................................ 355/1; 350/120
[58] Field of Search ............................. 355/1; 350/120

[56] References Cited

U.S. PATENT DOCUMENTS

| | | | |
|---|---|---|---|
| 3,194,142 | 7/1965 | Black, Jr. | 355/1 |
| 3,217,594 | 11/1965 | Simmon | 355/1 |
| 3,512,861 | 5/1970 | Schackert | 350/96 |
| 4,098,550 | 7/1978 | Randolph | 350/120 |
| 4,349,248 | 9/1982 | Rees | 355/1 |

OTHER PUBLICATIONS

"Unevenness of Illuminance Caused by Gradient-Index Fiber Arrays"; Matsushita and Toyama; Applied Optics, vol. 19, No. 7; pp. 1070-1075 (Apr. 1980).
Unevenness of Illumination Intensity Caused by Gradient Index Fiber; Matsushita and Toyama; Technical Digest of the Topical Meeting on Gradient Index Optical Imaging Systems Papers; pp. TuD1-TuD4 (May 1979).

Primary Examiner—Monroe H. Hayes

[57] ABSTRACT

The present invention is directed to optical imaging systems which utilize linear lens arrays and particularly gradient index lens arrays as the means for projecting light images onto a photosensitive image member. Exposure modulation at the image plane is reduced by oscillating the lens array during an exposure interval, the oscillating period and excursion distance being dependent upon the type of imaging environment the lens is used in. For document copying applications, the requirement for a two-row array to provide minimum exposure modulation is reduced so that a one-row lens array is enabled. For printer and RIS scanning functions, oscillation of a two-row array enables improved system efficiency and hence greater image irradiance and exposure.

18 Claims, 8 Drawing Sheets

IMAGING SYSTEM UTILIZING AN OSCILLATING GRADIENT INDEX LENS ARRAY

The present invention relates to improvements in imaging systems for copiers, non-impact and electronic raster input scanners (RIS) printers, and the like which utilize gradient index lens arrays as the projection means for forming unity magnification images at a photosensitive image plane. More particularly, the invention relates to a gradient index lens array which is oscillated during imaging, enabling improvements in system uniformity and efficiency and reduction in system costs.

Image transmitters comprising bundled gradient index optical fibers are well known in the art. U.S. Pat. No. 3,658,407 describes a light conducting fiber made of glass or synthetic resin which has a refractive index distribution in a cross-section thereof that varies parabolically outward from a center portion thereof. Each fiber acts as a focusing lens to transmit part of an image of an object placed near one end thereof and an assembly of fibers, transmit and focus a complete image of the object at an image plane. The fiber lenses are produced under the trade name "SELFOC". The mark is registered in Japan and owned by Nippon Sheet Glass Co., Ltd..

These gradient index lens arrays have found use in a number of technologies; e.g. as a replacement for conventional optical systems in copiers as diclosed in U.S. Pat. Nos. 3,947,106 and 3,977,777, as lens scanners imaging a document onto a full width detector array as disclosed, for example, in U.S. Pat. No. 4,509,826 and as the imaging device for an electronic printer as disclosed in U.S. Pat. No. 4,424,523.

When using gradient index lens arrays in a copying environment, a document is scan illuminated and a reflected image projected by the gradient index lens array onto a photosensitive surface such as a photoreceptor drum or belt. The gradient index lens array is inherently subject to a problem of non-uniformity of exposure (modulation) of the image at the image surface. All known prior art applications maintain exposure modulation within acceptable limits by combining at least two rows of gradient index fibers into a bundled configuration, shown, for example, in the U.S. Pat. No. 3,947,106 thereby increasing the field overlap contributed by each fiber. As known in the art, optimum modulation is achieved by selection of optimum array parameters including fiber lenghts and fiber spacing.

The multiple row array design, while reducing the exposure modulation to acceptable levels, is costly to implement. The fiber production and array assembly technique entails a significant cost penalty. It would be desirable to reduce these costs by reducing the number of rows required for the array. However, arrays comprising only a single linear row of fibers have been found to cause exposure modulation far in excess of the minimum level required to form acceptable images for reproduction purposes and have not heretofore been used or known to have been used in any copier application. A single row array will produce only one half the total exposure of a two-row array. However, with copiers, increasing the illumination level accordingly is a known design expedient.

Considering next the use of gradient index lens arrays in a printer or scanner environment, two row arrays are again the standard. For the printer application, a light producing device, typically a LED array, is addressed and the output is focused by the gradient index lens array onto a photosensitive image plane. For the RIS function, a document is scan illuminated by a linear illumination source and the reflected image is focused by the gradient index lens array onto a full width photosensor array. For both these applications, both total exposure and exposure modulation are critical. At the present time an array of at least two rows is a requirement for printer and scanner applications since, unlike copiers, these devices are typically light (total exposure) limited. Prior art arrays require designs which maintain exposure modulation, defined more fully below, within acceptable limits. Exposure modulation, however, is presently linked with a tradeoff in efficiency, (total exposure) with more light being required to achieve the desired exposure modulation level. It would be desirable then, to improve the efficiency (total exposure) of the two-row lens arrays presently utilized in the printer and RIS systems while holding the exposure modulation within acceptable limits.

The present invention is therefore, directed to reducing the cost of the lens arrays presently used in copier applications by enabling the use of a lens array comprising a single row of gradient index fibers. Further, the present invention is also directed to improving the efficiency and total exposure of the two-row arrays presently used in printer and scanner systems. More particularly, the invention is directed towards an optical imaging system including a plurality of gradient index optical fibers combined into at least a single row to form a linear lens array, said array positioned between an object plane and a photosensitive image plane and adapted to transmit and image, during an exposure interval, light from an object lying in the object plane onto the image plane, said system further including means for laterally oscillating the lens array, during an exposure interval, so as to reduce exposure non-uniformity at said image plane.

DESCRIPTION

Figure 1:
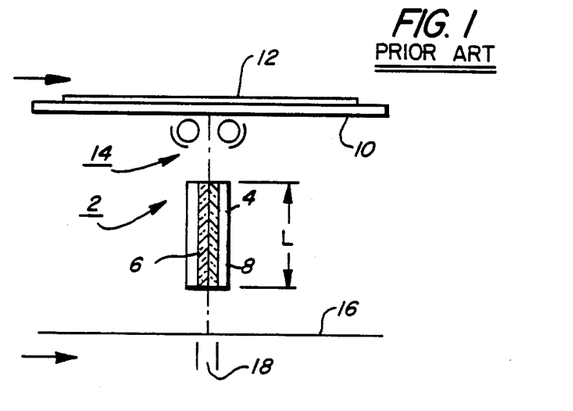
FIG. 1 is a side schematic view of a prior art copier imaging system utilizing a two-row gradient index fiber lens array.
Figure 2:
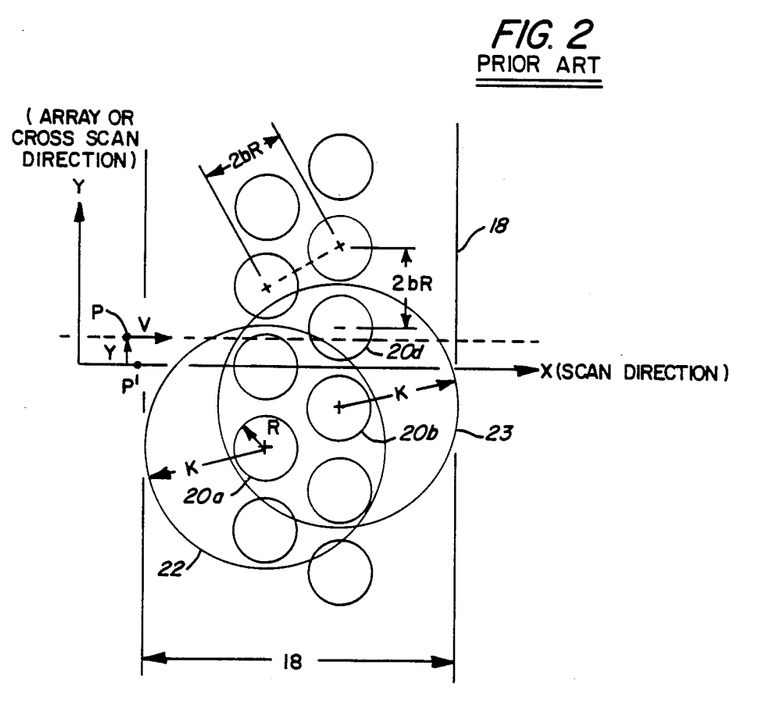
FIG. 2 is a top view of the image plane of FIG. 1, showing the irradiance profile of the optical fibers comprising the lens array.

Examining first, the use of a prior art, two-row gradient index lens array in a copier environment, FIGS. 1 and 2 and the following description, are intended to explain the manner in which such a lens array forms an erect, unity magnification image at a photosensitive image plane and examines the design parameters affecting the exposure uniformity. It will then simplify the following explanation of the problems involved in enabling a one-row array and the means by which the inventor solved the problem. The same means is then utilized in improving the efficiency of the two-row printer/scanner arrays, as described in detail below.

Referring now to FIG. 1, there is shown, in side view, an optical system 2 for a copier which includes a gradient index lens array 4 comprising two staggered rows 6, 8 of gradient index fibers of length L arranged in a bundled configuration, as is known in the prior art. In one embodiment, transparent object plane 10 is adapted for movement past lens array 4 in the indicated direction. Plane 10 has a document 12, supported thereon. Lamp assembly 14 provides an intense narrow band of illumination across a narrow width of the object plane 10.

In operation, plane 10 is moved across the illuminated area at a speed synchronous with that of imaging plane 16 which has a photosensitive surface. A narrow strip of light is reflected from document 12 and focused by lens array 4 onto exposure strip zone of plane 16. The band of illumination at the object plane should be wider than zone 18. FIG. 2 is a top view of an enlarged portion of two-row lens array 4 looking downward through the lens and viewing the exposure along the corresponding portion of zone 18. The fiber centers are separated by a distance 2 bR, as shown: b is an inter-fiber spacing parameter typically equal to about 1.03. A point P at imaging plane 16 moves at a speed v through exposure zone 18. The total exposure (E) that point P receives as it passes through zone 18 is a summation of the exposure values received from each contributing fiber. Each fiber 20 has an irradiance (e.g., fiber 20a has a profile 22 and fiber 20b has a profile 23), derived according to the principles set forth in an article by James D. Rees and William Lama entitled "Some radiometric properties of gradient-Index fiber lenses", published on Apr. 1, 1980 in *APPLIED OPTICS*, Vol. 19, No. 7. pp. 1065–1069, whose contents are hereby incorporated by reference.

The total exposure (E) point P receives is derived by using the summing equations disclosed in the Rees-Lama reference. The total exposure received by any point on the imaging plane passing through zone 18 is a function of its position on the y axis at the X-Y image plane. For example, point P' will receive a different distribution because of the different overlapping orientation of the contributing fibers. This exposure non-uniformity between different points on the imaging plane is inherent because of the fiber spacing of a gradient index lens and results in an image being formed on the image plane which varies in uniformity of exposure in the array (y) direction.

A useful equation derived by Rees-Lama in the previously referenced article to describe the extent of the circular irradiance profiles 22 or 23 is as follows:

$$k = -R \sec(\sqrt{A}\ L/2) = aR \quad (1)$$

where k (shown in FIG. 2) is the radius of the irradiance profile, (a) is an "overlap parameter" defined as k/R, R is the radius of the fiber, A is a gradient index constant and L is the fiber length. Equation (1) can be rewritten in terms of (a):

$$a = -\sec(\sqrt{A}\ L/2)$$

Figure 3:
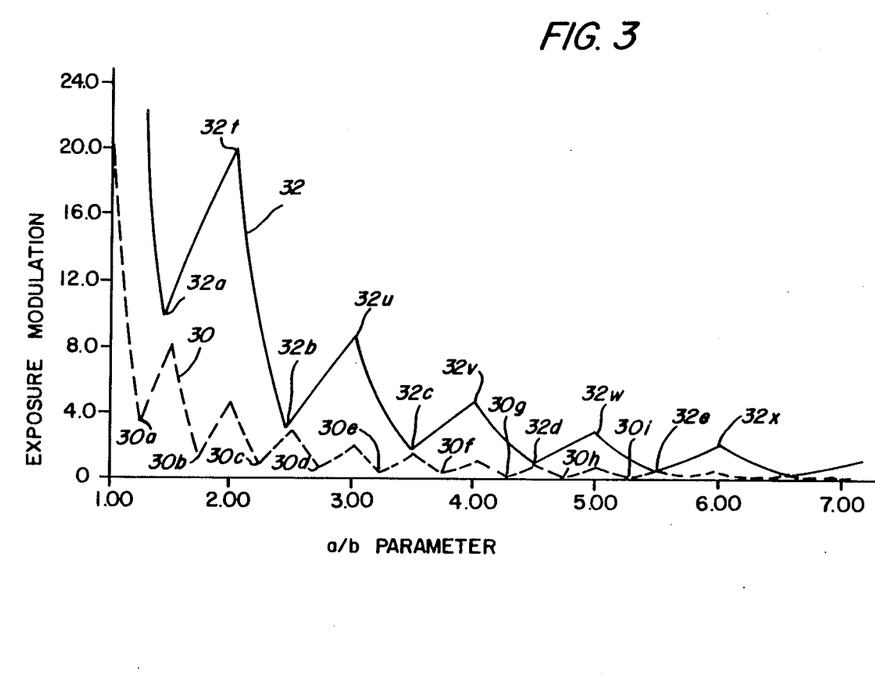
FIG. 3 is a plot of exposure modulation for a gradient index lens array having one or two rows of fibers when used in a copier mode.

If (a) is made to change by substituting appropriate values of A and L, values of a/b plotted against the exposure modulation yields plot 30 (for a two-row array) shown in FIG. 3. This exposure non-uniformity, or modulation, can be expressed in terms of maximum and minimum total exposure E:

$$E = \left(\frac{E\max - E\min}{E\max + E\min}\right) \times 100\% \quad (2)$$

As is evident, the exposure modulation at the image plane has various minimum and maximum values and generally decreases with increasing values of overlap parameter. Values of a/b, in commercial applications, will be within the range between 2.7 and 5.0. Plot 32, in FIG. 3, represents the exposure modulation for a one-row array. As seen, the modulation is significantly higher than the 2 row modulation in the a/b range of interest and would result in an unacceptable image exposure non-uniformity at the image plane.

Figure 4:
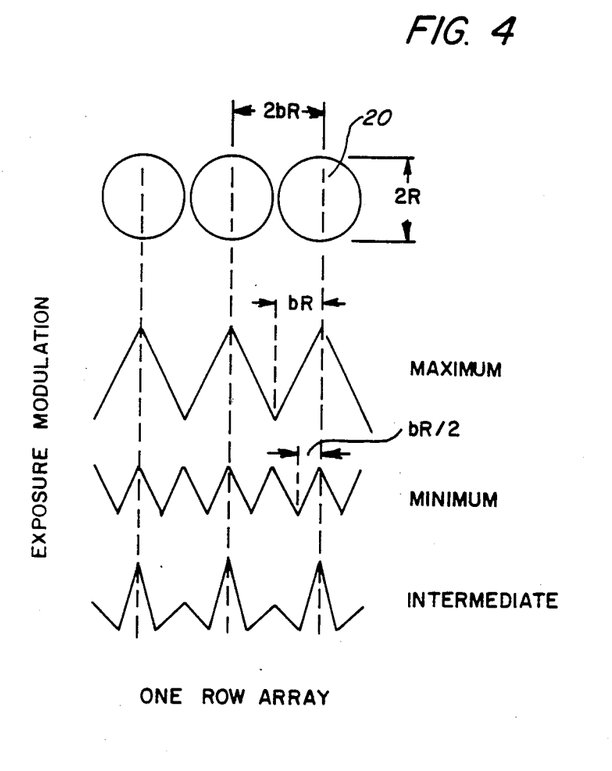
FIG. 4 shows maximum and minimum modulation points for a one-row array.
Figure 5A:
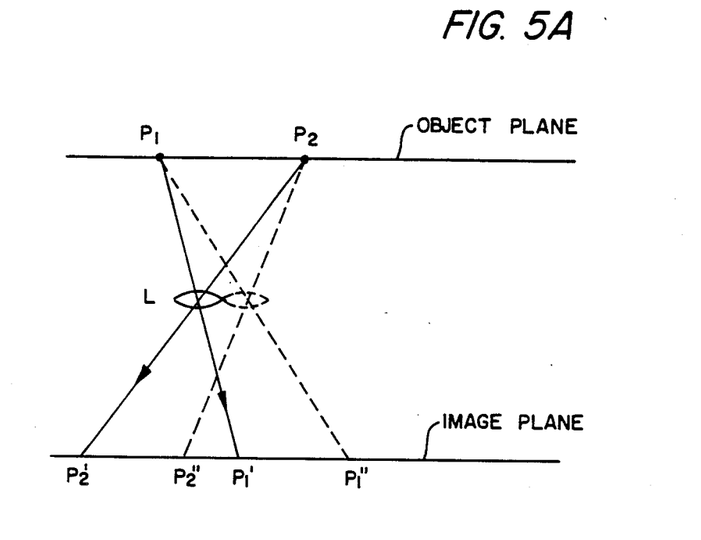
FIG. 5a shows an image shift occurring during a conventional lens movement.
Figure 5B:
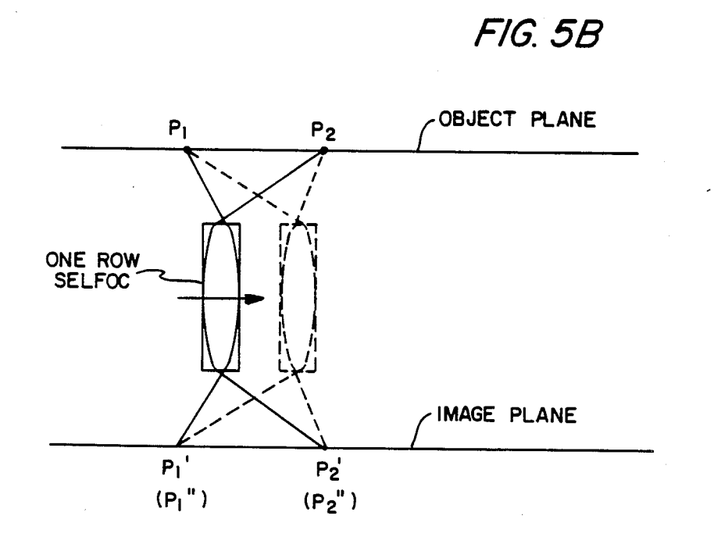
FIG. 5b shows a constant image position during lateral translation of a single row gradient index lens array.

The exposure modulation produced by a one-row array (FIG. 3) has a period which is related to the size and spacing of the individual fibers comprising the row and whether the a/b selection is at a modulation maximum, minimum or intermediate these two extremes. FIG. 4 shows the three possibilities and their relationship to the gradient index fibers 20. The maximum corresponds to peaks 32t–x while the minimum corresponds to valleys 32a–h. According to one of the principles of the present invention, it has been found that if a one-row array, appropriately positioned between the object and image plane, is translated laterally along the array direction (left to right in FIG. 4), the exposure profile (e.g. the light level) will also move laterally. This is because the irradiance profiles are tied to the fibers themselves, as shown in FIG. 2, and move therewith. Surprisingly, however, the actual optical image will remain stationary, which, of course, is necessary to maintain a blur-free image formation. As shown in FIG. 5a, if a conventional inverting lens L is used to image points $P_1$, $P_2$ at an object plane onto an image plane (as $P_2'$ $P_1'$) movement of the lens laterally to the right, results in corresponding movement of the image points to $P_1''$, $P_2''$. However, as shown in FIG. 5b, if the imaging member is an erecting one (or two) row gradient index lens array, movement of the lens array to the right does not move the imaged points $P_1'$, $P_2'$. As the lens array moves, object points enter and leave the field of view of the lens. The image points do not change but the irradiance and exposure levels do. (The motions shown in FIGS. 5a and 5b are exaggerated for descriptive purposes.)

Figure 6:
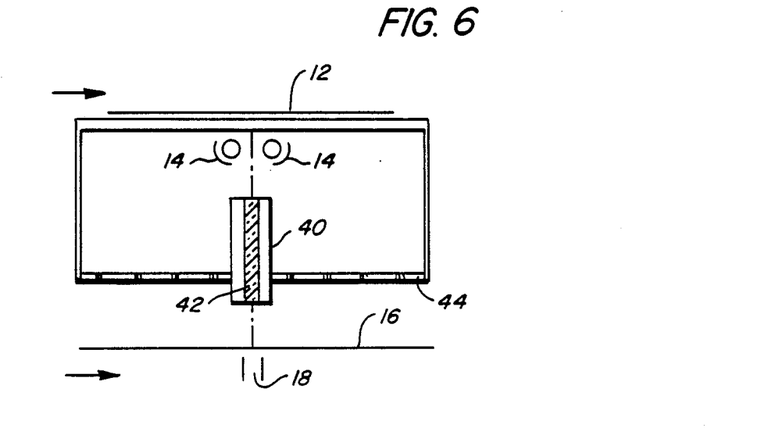
FIG. 6 shows a side view of an imaging system where the lens is oscillated during the exposure interval to improve exposure uniformity.
Figure 7:
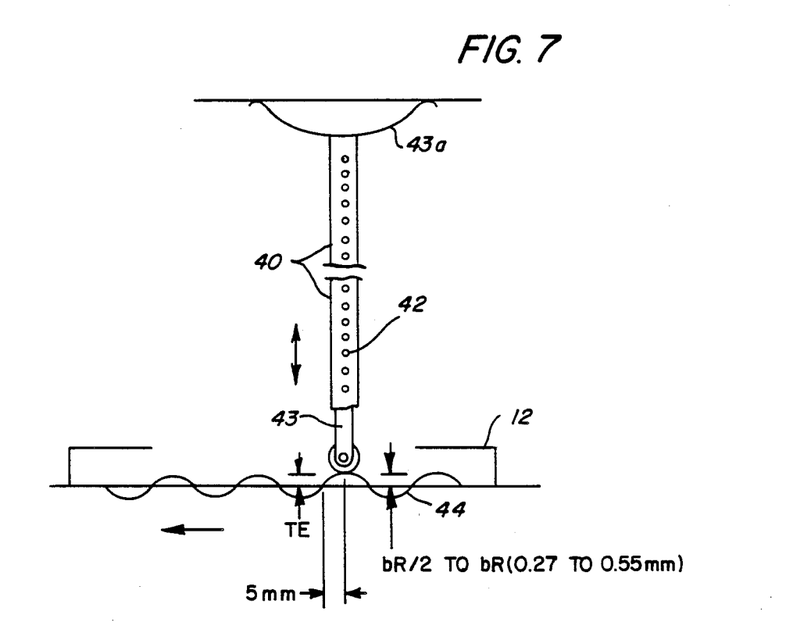
FIG. 7 shows a partial top view of the FIG. 6 embodiment.

It is evident, from FIG. 4, that any small motion of the lens array during exposure in the array direction will reduce the modulation (improving uniformity) but there exists an optimum motion during a given exposure period. Referring to FIG. 4, the optimum motion for the maximum modulation case would be bR while the optimum motion for minimum modulation case is bR/2. This motion may be implemented most simply by tying the lens movement to a scanning function. For example, FIGS. 6 and 7 show the optical system of FIG. 1 modified by the replacement of the two-row array with an array 40 having a single row 42 of gradient index fibers. The array is biased by a combination of biased spring 43a and spring roller 43 to ride against the surface of a sinusodial linear rack 44 attached to platen 12. As the platen moves through its scan cycle, array 40 is oscillated laterally. The exposure zone 18 is typically about 5 mm. Thus, rack 44 should be configured so as to enable lens array 40 to make at least one translational excursion TE, during the time it takes belt 16 to travel 5 mm. Other mechanisms may be used to achieve sinusoidal movement such as enclosing rack 44 and roller 43 within an enclosed channel. From FIG. 3 it will be seen that the one-row array is characterized by having a useful a/b parameter of between 1.25 and 7.

Figure 8:
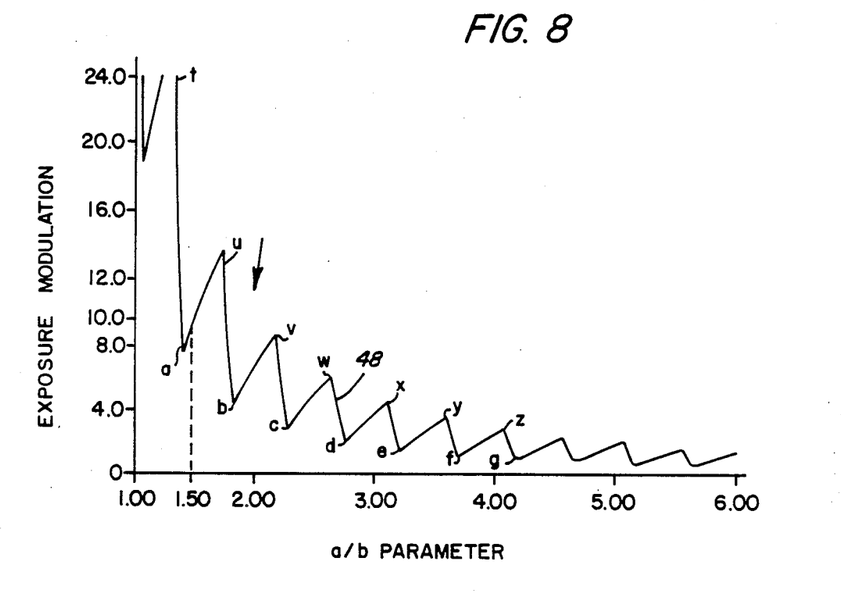
FIG. 8 is a plot of exposure modulation for a two-row gradient index lens array when used in a printer or scanner mode.

Turning now to the case of the lens array used in a printer or RIS application, the principle of oscillating the lens is maintained but modified in the implementation. As mentioned previously, for these two applications, the efficiency and total exposure have been undesirably reduced in order to hold exposure modulation within acceptable limits. The efficiency of a two-row array is reviewed in detail in an article by William Lama entitled "Optical properties of GRIN fiber lens arrays", in the Aug. 1, 1982 APPLIED OPTICS, Vol. 21, No. 15, pp. 2739-2746. Efficiency is therein defined as:

$$\epsilon = \left(\frac{\pi}{2ab}\right) T n_o^2 A R^2 [1 - 3b^2/4a^2] \quad (3)$$

where $n_o$ is the refractive index for the fiber axis, A is a positive gradient constant, R is the fiber radius, b is the inter-fiber spacing parameter. Differentiation of Equation (3) shows that the efficiency is maximized when the a/b parameter is 1.5. FIG. 8 shows a plot 48 of exposure modulation vs. a/b parameter for a two-row gradient index lens array used in a printer or RIS. Plot 48 has maximum and minimum value 48t-z and 48a-g respectively. For the 1.5 value of a/b, as shown in FIG. 8, a large (10%) and unacceptable value of exposure modulation results. In order to keep the exposure modulation within acceptable limits, heretofore it has been necessary to design arrays for printing and scanning purposes with a/b values typically greater then 2.7. At this value, efficiency is reduced from optimum by about 25%. For scanner or printer applications, a reduction of 30% in efficiency will result in a 30% reduction in total exposure.

Figure 9:
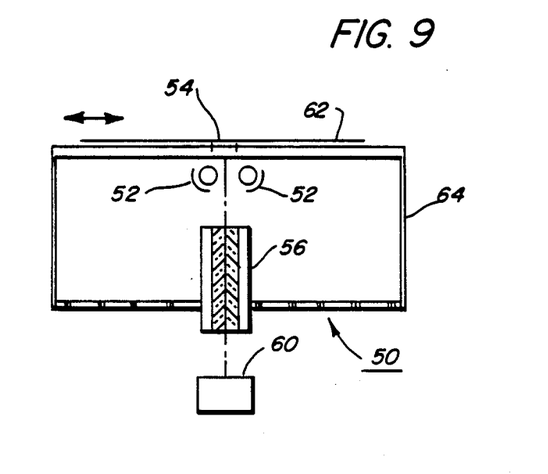
FIG. 9 is a side view of an imaging system for a RIS where the lens is oscillated during an exposure interval.

FIG. 9 shows a RIS optical system 50 embodying the principles of the present invention. Lamp assembly 52 is disposed on each side of scanning slit 54 to provide a narrow incremental band of illumination along the scan strip. Two-row gradient index lens array 56 is disposed intermediate the moving document platen 58 and a linear photosensor array 60 and in a position to form a unity magnification image of the scanned portion of the document onto the surface of array 60. In operation, successive line scans are made across a document 62 by array 60 as the platen is moved past scanning slit 54. The exposure zone, for this case, is defined by the edge of the photosensor array pixels. As will be understood by those skilled in the art, the individual viewing elements that comprise array 60 are sampled successively as each line is scanned to produce a stream of image signals or pixels for each line scanned. The individual pixels produced each comprises a discrete voltage representative of the image area of document 62 viewed by the individual lenslets comprising array 60. One commonly available full-width scanning array is a FIE-8A linear array manufactured by Fuji Xerox Co., Ltd..

Figure 10:
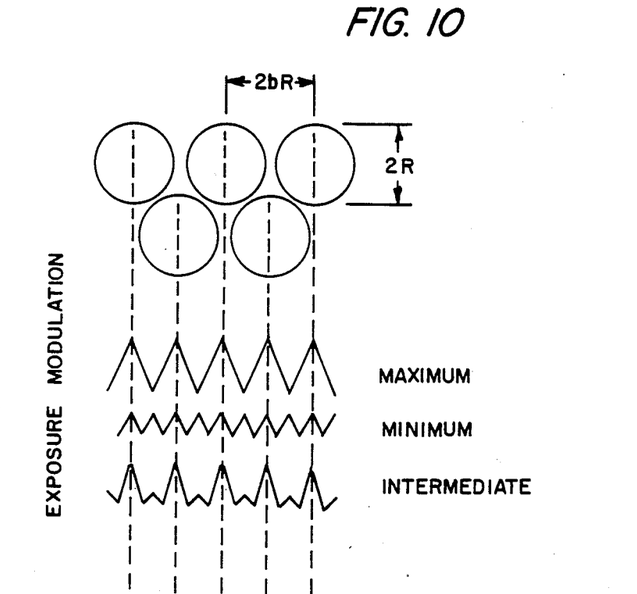
FIG. 10 shows minimum and maximum modulation points for a two-row array.
Figure 11:
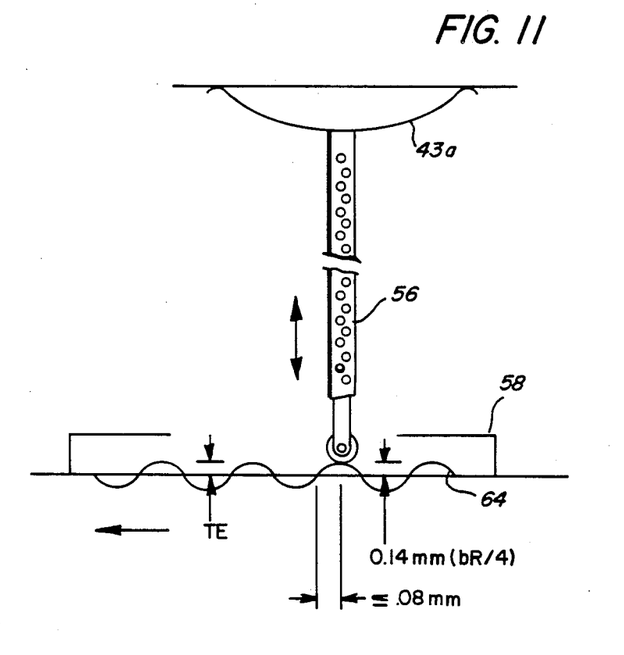
FIG. 11 shows a partial top view of the FIG. 9 embodiment.

As in the case of the copier function, the exposure modulation for the two-row scanner array has a period which is related to the size and spacing of the individual fibers comprising the two rows and is further defined by whether the a/b selection is at a modulation maximum, minimum or intermediate. FIG. 10 shows the three possibilities and their relation to the gradient index fibers of lens array 58. The maximum corresponds to peaks 48t-z while the minimum coverage to valleys 48a-g. Again, a small lateral motion (left to right) of the array will reduce the modulation but there are optimum motions during a given exposure period. The optimum motion at maximum modulation is bR/2 and bR/4 for minimum modulation. Typical values for R are 0.5325 mm and 0.5485 mm for bR/2. However, unlike the copier case, the excursion time is considerably reduced because the exposure zone (at array 60) is typically 0.08 mm for a 300 spots per inch application, a much smaller exposure zone value than for the 5 mm copier case. Thus, for scanners, and referring to FIGS. 9 and 11, lens 56 should make at least one transitional excursion TE during the time it takes the platen to travel 0.08 mm. As for the copier case, array 56 rides in a spring biased relation with sinusoidal linear rack 64, mounted along platen 62.

What has been disclosed above for the scan case is equally relevant to the printer case wherein a linear light bar such as an LED array defines the light entering the array, and therefore also defines the exposure zone at a photoreceptor surface. Other image light bar examples are liquid crystal shutters (LCS). The exposure zone for printing applications is approximately the same 0.08 mm width for a 300 spi application.

Since the lens array excursions for the scanner and printer cases are much more rapid, other mechanisms for imparting the oscillating movement to the lens may be required. As one example, a pizeoelectric transducer may be attached to the lens array and periodically addressed to produce the required motion as is known in the art.

In summary there has been described, a mechanism for enhancing the operation of those imaging systems which utilize a gradient index lens array to produce unity magnification images. The main feature of the invention is the oscillation of the lens in a cross-scan, or array direction (lateral to the scan direction). This motion moves the exposure profile to fill in non-uniform areas, reducing exposure modulation and improving uniformity. This motion is not accompanied by any blurring of the image. If the invention is practiced in a copier mode, a one-row array is enabled, permitting savings in lens array procurement and assembly costs. If the usage is in a scanner or printer environment, the invention permits the two-row lens array to be operated at higher efficiency levels.

For the copier case, although one of the main benefits is enabling a one-row lens array for scan systems, it may be desirable to maintain a two-row lens array. For this case, the prescribed oscillation of the lens array will yield some improvement of the exposure modulation. Similarly, for the scanner or printer case, the prescribed oscillation would work for a one-row array and reduce cost, if sufficient light (printer) or sensitivity (scanner) were available.

While the invention has been described with reference to the structure disclosed, it is not confined to the details set forth, but is intended to cover such modifications or changes as may come within the scope of the following claims. For example, the discovery that lens movement does not result in projected image movement is a property of erecting unity magnification lenses and would include devices such as linear strip lenses of the type disclosed in U.S. Pat. No. 3,687,545. Although the invention is optically useful in a unity magnification system, the invention may also be practiced in imaging systems which utilize gradient index lenses in a reduction/magnification mode. For example, U.S. Pat. No. 4,415,258 discloses an imaging system which forms a reduced or enlarged image at an image plane. Lateral oscillation of this lens, unlike the 1X case, does result in image point movement at the image plane. However, for some systems a one row system may be designed to be oscillated at values close to unity and the resultant image blurring may be acceptable for the particular systems. As a further example of a modification, although the lens arrays in each of the embodiments has been shown as being fixed relative to a moving platen, the lens may be adapted to scan a fixed platen as is known in the art. These and all the other modifications are intended to be embraced by the following claims:

What is claimed is:

1. An optical imaging system including a plurality of gradient index optical fibers combined into at least a single row to form a linear lens array, said array positioned between an object plane and a photosensitive image plane and adapted to transmit and image, during an exposure interval, light from an object lying in the object plane onto the image plane, said system further including means for laterally oscillating the lens array, during an exposure interval, so as to reduce exposure non-uniformity at said image plane.

2. The optical imaging system of claim 1 wherein said object plane is a document platen and said image plane is a photoreceptor member and wherein said lens array is a single row array.

3. The imaging system of claim 2 wherein said lens array undergoes one translational excursion during the time the photoreceptor member travels approximately 5 mm.

4. The imaging system of claim 2 wherein the optimum motion of the lens for minimum modulation is defined by the expression $bR/2$ where b is the inter fiber spacing and R is the fiber radius.

5. The imaging system of claim 2 wherein the optimum motion of the lens for maximum modulation is defined by the expression $bR$ where b is the inter-fiber spacing parameter and R is the fiber radius.

6. The imaging system of claim 2 wherein said lens array is a multiple row array.

7. The imaging system of claim 2 wherein said oscillating means is enabled by said platen motion.

8. The imaging system of claim 1 wherein said object plane is a movable document platen, said image plane is a photosensor array and said lens array is at least a single row array.

9. The imaging system of claim 8 wherein said lens array undergoes one translational excursion during the time the platen travels approximately 0.08 mm.

10. The imaging system of claim 8 wherein the optimum motion of the lens for minimum modulation is defined by the expression $bR/4$ and for maximum modulation $bR/2$ where b is the inter fiber spacing and $R/2$ is the fiber radius.

11. The imaging system of claim 1 wherein said object plane contains a linear light bar and said image plane is a photoreceptor member.

12. The imaging system of claim 1 wherein said array is positioned so as to form an erect, non-unity magnification image at said image plane.

13. The imaging system of claim 1 wherein said array is positioned so as to form an erect, non-unity magnification image at said image plane.

14. The imaging system of claim 1 wherein said oscillating means comprises a sinusoidal linear rack extending along the scan direction and further comprising means for spring loading said lens array against said rack.

15. An imaging system wherein a document at an object plane is to be reproduced at a photosensitive image plane at 1:1 magnification, the system comprising, in combination:
   a linear lens array for forming erect images at unity magnification at said image plane positioned between the object and image plane,
   means for incrementally illuminating the document during an exposure interval,
   means for providing relative movement between the document, lens array and image plane, and
   means for laterally oscillating the lens array during an exposure interval.

16. The imaging system of claim 15 wherein the linear lens array includes a single row of gradient index fibers.

17. The imaging system of claim 15 wherein the linear lens array is a strip lens.

18. A method for reducing non-uniformity of images formed at a photosensitive image plane by a linear lens array comprising the steps of:
   positioning the lens array equidistant an object and image plane,
   directing an image radiation pattern into the entrance face of the lens array,
   providing relative movement between the object plane, lens array and image plane so as to enable a scanning function, and
   laterally oscillating the lens array during the scanning function.

* * * * *